(12) United States Patent
Lewis

(10) Patent No.: US 6,286,224 B1
(45) Date of Patent: Sep. 11, 2001

(54) TRANSPORTABLE CLOTHING MEASURING TEMPLATES

(76) Inventor: Deanna Lewis, 9956 Whitewater Dr., Burke, VA (US) 22015

( * ) Notice: Subject to any disclaimer, the term of this patent is extended or adjusted under 35 U.S.C. 154(b) by 0 days.

(21) Appl. No.: 09/240,912

(22) Filed: Jan. 29, 1999

(51) Int. Cl.$^7$ ............................................. G01B 3/14
(52) U.S. Cl. ............................. 33/562; 33/512; 33/760
(58) Field of Search ........................... 33/562, 563, 566, 33/565, 512, 514.1, 514.2, 755, 759, 760, 2 R, 8, 9 R, 555.4, 555.1, 11, 12, 17 R

(56) References Cited

U.S. PATENT DOCUMENTS

| | | | | |
|---|---|---|---|---|
| 146,974 | * | 2/1874 | Allen | 33/514.1 |
| 1,062,525 | | 5/1913 | Ward | 33/555.2 |
| 1,213,607 | * | 1/1917 | Engelsman | 33/514.1 |
| 1,404,601 | * | 1/1922 | Gordon | 33/555.4 |
| 1,667,802 | * | 5/1928 | Homan, Jr. | 33/512 |
| 2,205,626 | * | 6/1940 | Mason | 33/755 |
| 2,977,684 | | 4/1961 | Campanile | 33/2 R |
| 3,832,780 | * | 9/1974 | Lewis | 33/512 |
| 3,964,169 | * | 6/1976 | Bush | 33/514.2 |
| 4,219,029 | * | 8/1980 | Grossman et al. | 33/2 R |
| 5,065,523 | * | 11/1991 | Chiang | 33/562 |
| 5,065,830 | | 11/1991 | Stevenson | 177/263 |
| 5,269,069 | * | 12/1993 | Min | 33/514.1 |
| 5,353,513 | * | 10/1994 | Round | 33/555.2 |
| 5,588,215 | | 12/1996 | Hart | 33/2 R |
| 5,920,998 | * | 7/1999 | Slilaty | 33/512 |
| 5,926,966 | * | 7/1999 | Russell | 33/562 |

* cited by examiner

Primary Examiner—Andrew H. Hirshfeld
(74) Attorney, Agent, or Firm—Roberts Abokhair & Mardula, LLC

(57) ABSTRACT

A portable measuring device for comparing the size of a body to an article of clothing. The invention comprises a measuring tape having either absolute or relative measurements imprinted thereon. The circumference of a body location is measured and a dimension, either relative or absolute, is determined. The measured dimension is then compared to a series of nested, rigid templates, each template representing a specific circumferential dimension. A template is selected based upon the circumference measured. That template is then used to compare the size of an article of clothing to the circumference of the individual being measured. The rigid template is inserted in the article of clothing and the fit is determined based upon how well the template fits inside the article of clothing desired.

11 Claims, 3 Drawing Sheets

TRANSPORTABLE CLOTHING MEASURING TEMPLATES

FIELD OF THE INVENTION

This invention relates generally to the field of measuring devices. More particularly, the present invention comprises a series of transportable templates for measuring and fitting clothing to various body sizes.

BACKGROUND OF THE INVENTION

Purchasing clothing, and particularly children's clothing, can be a taxing activity. The children themselves can frequently be uncooperative, leaving shoppers to purchase children's clothing without the children present. Further, it is often the case that children's clothing is bought as a gift for a child, and therefore the child is not present to ensure that the clothing fits properly. To add to this confusion, the physical size of garments which are labeled with the same size can frequently differ sufficiently such that a garment labeled "3T" from one manufacturer may be a totally different size than a garment labeled "3T" from another manufacturer.

Age, (as is often used on sizing labels of children's clothing) is not a consistent determining factor in the sizing of a garment. For example, a child of ten months of age will not always be a size two and, as noted above, the size of clothing itself varies from manufacturer to manufacturer even though the size designated may be the same. Add to this, the fact that different fabrics will result in different sizes, and a consumer is faced with a daunting task of attempting to find clothing that fits a particular child.

The result of this confusing situation is not simply a large number of irate consumers dissatisfied with the sizing of children's clothing. The effects are felt in other areas of commerce. For example, when clothing is returned to a retailer, a consumer must go thorough the process of either obtaining a credit or refund of the money paid for the garment. This takes the time and effort not only of the consumer in traveling back to the store, but requires the time and effort of the employees of the store itself. It also involves credit and banking transactions. Thus, money is wasted in such an exchange by virtue of the fact that individuals must be assigned to the exchange and return task without yielding any resulting sale. Thus, there is a financial drain on the staffing resources of the retailer.

Some attempts have been made to provide measuring devices that are somewhat portable in nature. For example, U.S. Pat. No. 1,062,525 to Ward describes a portable gauge having rings which nest inside one another. However, such series of rings cannot be slipped over an infant in order to determine the appropriate size.

U.S. Pat. No. 2,977,684 to Campanile was issued for a neck seal sizing template. This is an invention for measuring neck seals associated with flying anti-exposure suits worn for protection against cold water exposure. The template is a conical shaped device for measuring neck size.

U.S. Pat. No. 5,588,215 to Hart was issued for a transportable measuring device for children's clothes. This invention basically constitutes a form of tape measure which is useful for measuring length but is not particularly productive in measuring the circumference of waists or chest dimensions on clothing which are equally important in the fit of a garment for a child or infant.

What would therefore be useful is a device which could be used to measure the dimensions of an individual (child or adult) which could then be used with a more rigid device that would be transportable, and be able to fit inside a garment to simulate the body dimensions of the potential wearer. Ideally this device would be portable and would be used to compare the fit of the garment to the individual without the individual present and before the garment is purchased.

SUMMARY OF THE INVENTION

It is therefore an objective of the present invention to be able to measure body dimensions of the wearer of a garment (child or adult) prior to going to a clothing establishment.

It is a further objective of the present invention to establish the body dimensions of a wearer in the form of a physical device that can be transported to the location where garments are sold.

It is a further objective of the present invention to create a sizing device that can be inserted into a garment, thereby more closely approximating the body dimensions of the potential wearer.

It is a further objective of the present invention to greatly diminish the wasted consumer's time as well as the waste of time of accounting and staffing resources at a retailer location occasioned by the return of garments which do not fit the potential wearer.

These and other objectives of the present invention will become apparent from the general and detailed description of the invention which follows. The present invention comprises a plurality of variably sized portable templates approximating the body dimensions, specifically the circumference, of the wearer. The portable templates are keyed to a measuring tape having specific measurement indicators which correspond to one of the plurality of variable sized templates.

If one envisions the human torso as generally tubular in shape, with the circumference of the tube varying at different locations on the body, one can measure the circumference of the torso at particular locations on the body using a form of tape measure. The tape measure of the present invention would, for example, measure the circumference of the waist of a wearer, measure the circumference of the chest of a wearer, or the circumference of other parts of the wearer. The tape measure can be dimensioned in any series of ways, for example, in inches, centimeters, or in an application-specific manner which allows the user of the tape to determine a particular size template to select.

The invention further comprises a series of templates, generally annular in shape, one fitting inside another similar to the rings of a tree although this is not meant as a limitation. For example, the size rings of the present invention may simply be a series of rings which are generally sold together much as one would buy a series of measuring spoons. The size of the templates increases to accommodate the stages of growth of individuals from infancy through adulthood.

To use the present invention, a user would measure the infant, toddler, or adult around the torso at various areas (chest, abdomen, head) with a tape measure having specific measurements keyed to the individual templates of the plurality of varying size templates of the present invention. Once the circumference of, for example, the waist, is determined, a number is measured, which number corresponds to a particular one of the plurality of varying size templates.

Upon selection of the template, the template is transported to the clothing store and inserted into the garment which is desired to be purchased by the user. If the fit of the garment is snug or loose, the template is simply inserted into the next size (up or down) garment until the appropriate garment size is found.

Since the size of the template does not change, the actual size label on the garment to be purchased becomes irrelevant. The sole issue for the user is whether or not the garment fits appropriately over the portable template. It is envisioned that such templates would be standardized in size and sold widely. In this fashion, an individual in New York can simply note to a relative or potential buyer in California the appropriate size template to use to purchase garments for an individual. The user in California can then go to a store in California and be assured that the garment selected would be the appropriate size since the standardized templates would be the same size from one locale to another.

DETAILED DESCRIPTION OF THE INVENTION

As noted above, the present invention comprises a series of rigid or semi-rigid annular rings nested one inside the other of increasing size. The circumferences of the rings are dimensioned to represent the range of circumferences which would correspond to the circumference of various body locations of the user. This plurality of nested templates is selected via a tape measure having demarcations which correspond to the individual templates.

Figure 1:
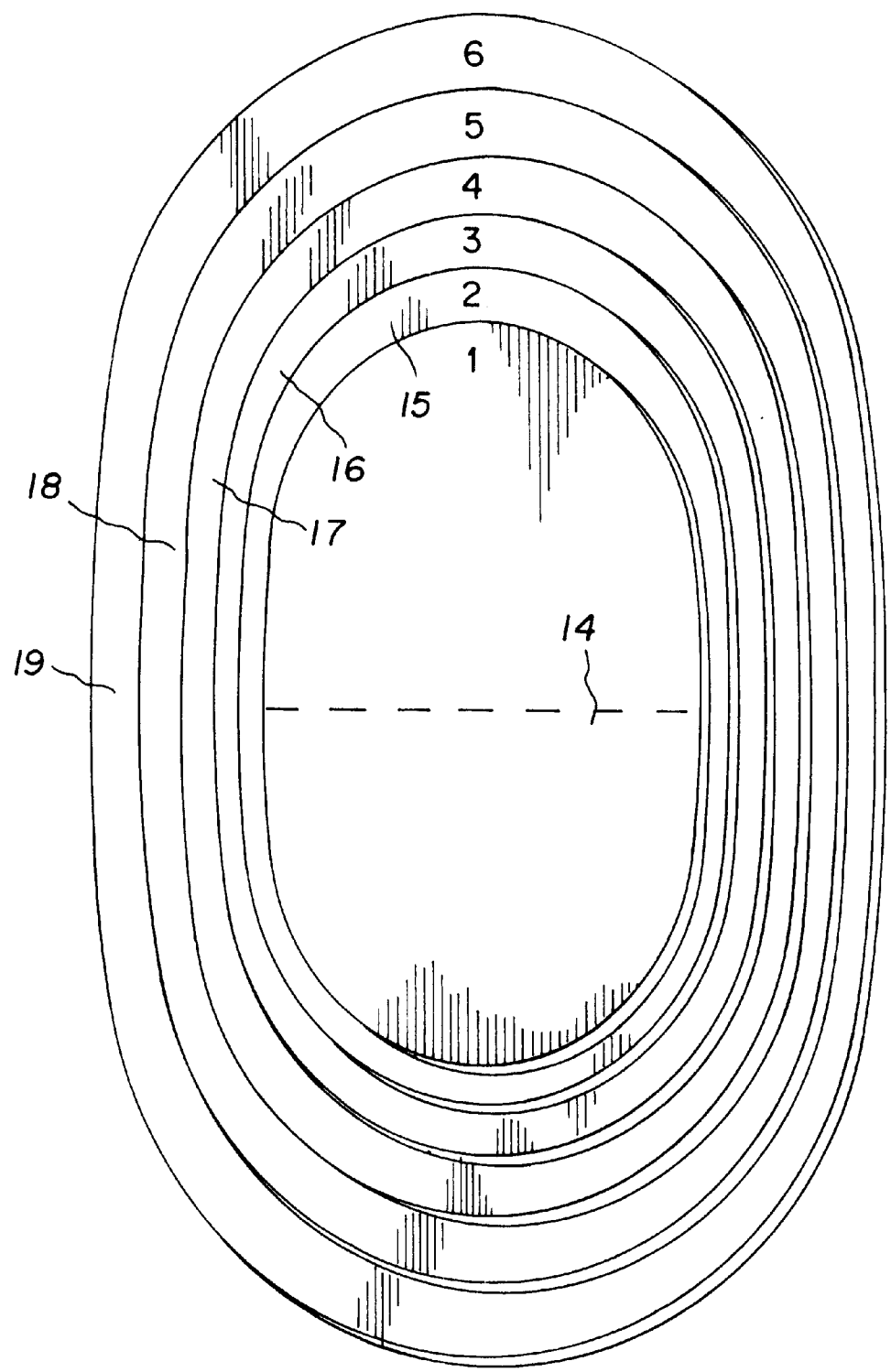
FIG. 1 illustrates a typical embodiment of the present invention comprising a plurality of nested templates of varying sizes.

Referring to FIG. 1, the nested templates of the present invention are illustrated. The present invention comprises in part, a series of rigid or semi-rigid, generally annular, rings which nest one inside the other. The central disk 14 is labeled with either an absolute or relative dimension 14A. This central disk 14 sits inside the next larger template 15 which has its own absolute or relative measurement 15A designated thereon. Template 15 nests inside template 16, which again has its own absolute or relative measurement imprinted thereon. Templates 17, 18, and 19 nest inside one another and each has its own absolute or relative measurement 17A, 18A, and 19A designated thereon. As noted earlier, the size rings of the present invention need not necessarily be nested only that a range of ring sizes be available to the user.

The number of templates depicted in FIG. 1 is not meant as a limitation, but is shown as an example of the present embodiment of the current invention. The circumference of the templates of the present invention can vary from the smallest infant to the largest adult.

In addition, the materials of which the present invention is constructed can vary, so long as they are semi-rigid in construction so as to allow them to be inserted into clothing while maintaining their circumferential dimensions. Thus, it is envisioned that the present invention can be made from plastics of varying types, nylon, aluminum, wood, cardboard, or indeed any other material that can maintain its shape when inserted inside an article of clothing.

Figure 2:
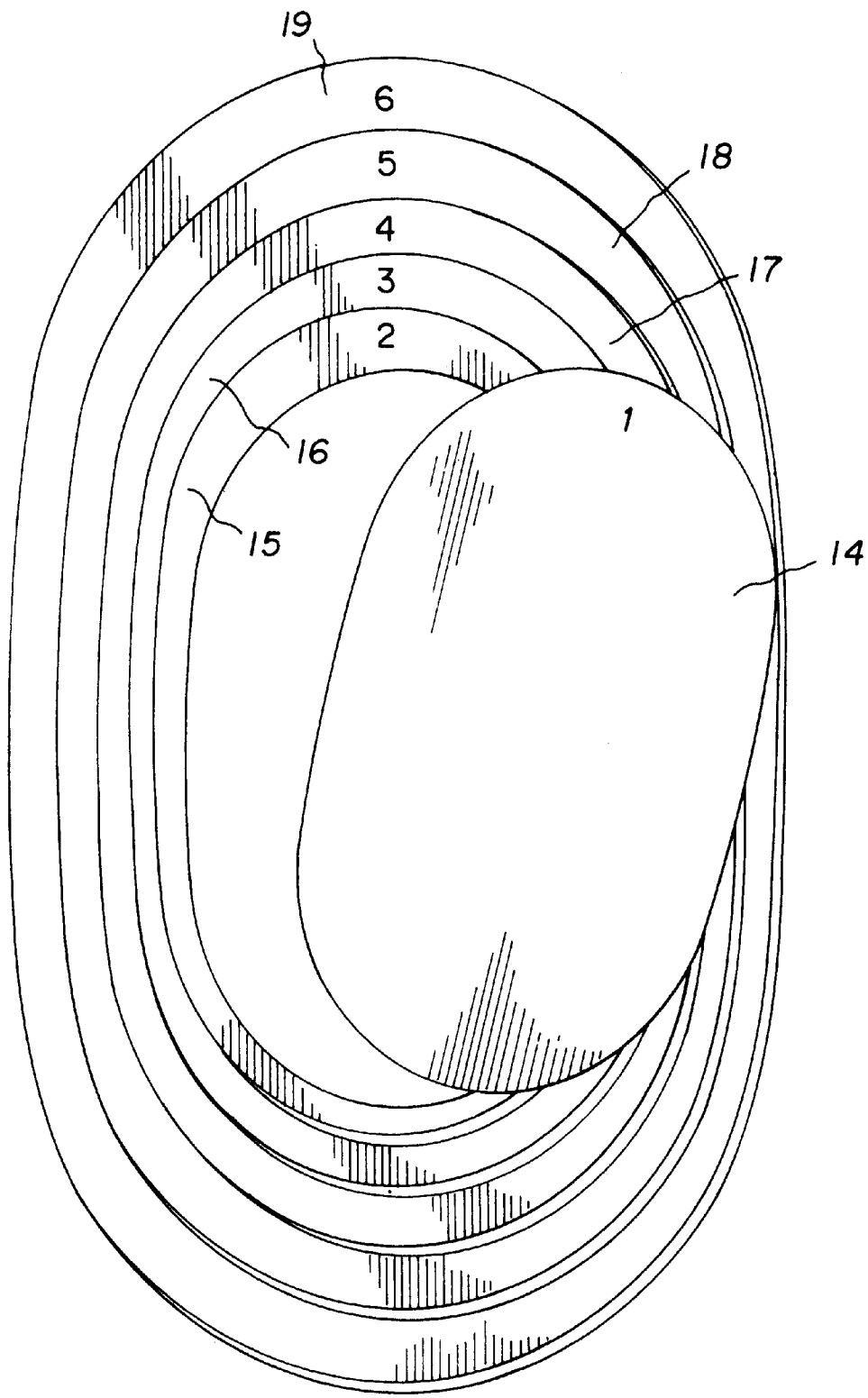
FIG. 2 illustrates the nested templates of the present invention showing the detachable nature of the individual templates.

Referring to FIG. 2, the embodiment illustrated in FIG. 1 is again shown with the central sizing template disk removed. In this illustration, central disk 14 is seen as removed from the plurality of sizing templates constituting the present invention.

Figure 3:
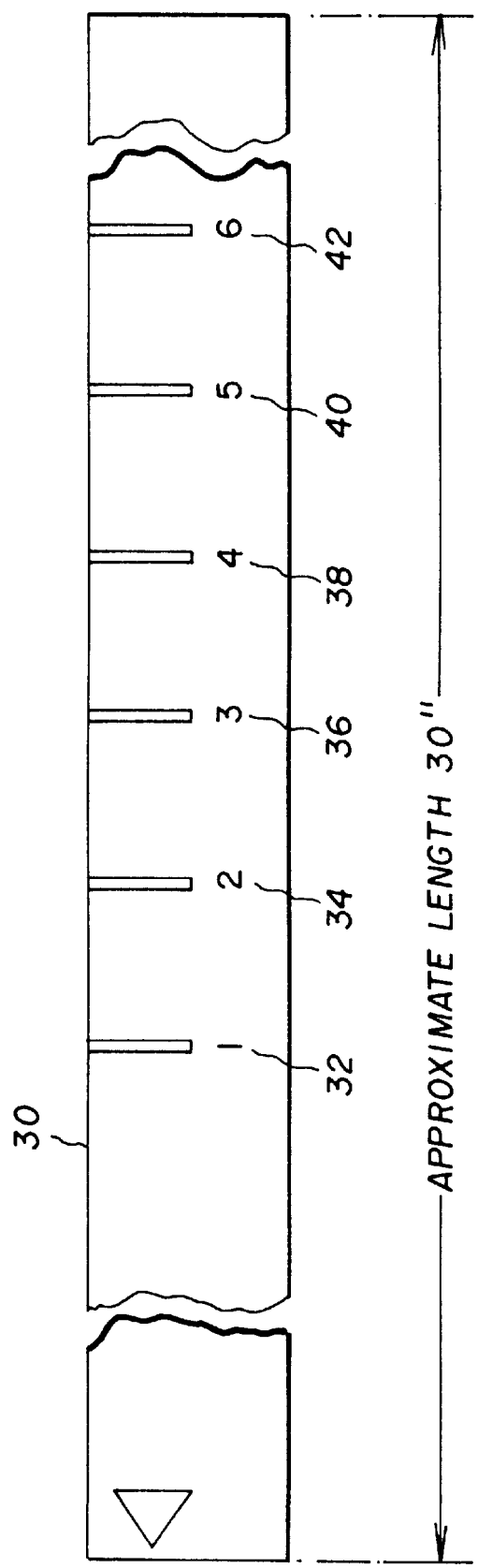
FIG. 3 illustrates a typical embodiment of the device for measuring the person being fitted.

Referring to FIG. 3, the measuring device associated with the rigid templates of the present invention is shown. The measuring device is basically a tape measure 30 which a person can use to measure the circumference of various body locations of the individual for whom clothing is to be purchased. The tape measure 30, in the preferred embodiment, comprises a series of relative measurements 32, 24, 36, 38, 40, 42 which are keyed to the like-numbered templates of the series of rigid sizing templates (shown in FIG. 1). In this fashion, when the tape measure indicates a circumference of "4" the user simply selects sizing template 17 (see FIG. 1) as the template to be transported to the store and used to size the individual garments to be purchased. As noted earlier, the tape measure can also measure absolute circumference in inches or centimeters. In this case, the rigid templates of the present invention are so labeled in absolute numbers corresponding to the tape measure.

Having thus explained the present invention, it will be readily apparent to those skilled in the art that the preferred embodiments and examples described are for illustrative purposes only and are not to be construed as limiting the scope of the present invention, which is properly delineated only in the claims attached hereto.

I claim:

1. An apparatus for comparing the size of clothing to the size of a human body comprising:

a plurality of templates dimensioned to approximate a torso of said body, each of the templates further comprising a numeric designation; the templates varying in size from one to another of the plurality of templates; and a flexible tape measure dimensioned to measure a circumference of said torso, the tape measure further comprising numeric designations corresponding to the numeric designations of the plurality of templates to key the tape measure to the plurality of templates.

2. The apparatus for comparing the size of clothing to the size of a body of claim 1, wherein each of the plurality of variable size templates comprises rigid material.

3. The apparatus for comparing the size of clothing to the size of a body of claim 2, wherein the rigid material is selected from the group consisting of plastic, wood, aluminum, cardboard, and composite material.

4. The apparatus for comparing the size of clothing to the size of a body of claim 1, wherein the numeric designation of each template is a relative designation corresponding to a relative designation on the tape measure.

5. The apparatus for comparing the size of clothing to the size of a body of claim 1, wherein each numeric designation is absolute.

6. The apparatus for comparing the size of clothing to the size of a body of claim 5, wherein the absolute numeric designation is selected from the group consisting of English measurements and metric measurements.

7. The apparatus for comparing the size of clothing to the size of a body of claim 1, wherein the tape measure measures circumference in relative numbers corresponding to relative numbers of the sizing templates.

8. The apparatus for comparing the size of clothing to the size of a body of claim 7, wherein the tape measure additionally measures circumference in absolute numbers.

9. The apparatus for comparing the size of clothing to the size of a body of claim 8, wherein the numeric designations in absolute numbers are selected from the group consisting of English and metric measurements.

10. The apparatus for comparing the size of clothing to the size of a body of claim 1, wherein the plurality of templates varying in size are nested one inside another.

11. A process for comparing the size of clothing to the size of a human body comprising:

measuring the circumference of a location on a torso of said body using a flexible tape measure establishing the circumference of said location on said body as a unit of measure;

selecting a numerically designated, rigid and annular template from a plurality of templates of varying sizes that corresponds to the unit of measure measured on the tape measure;

inserting the selected rigid annular template in an article of clothing; and comparing the size of the article of clothing to the size of the template, thereby establishing a fit of the article of clothing.

* * * * *